(12) United States Patent
Reunamäki

(10) Patent No.: US 7,733,229 B2
(45) Date of Patent: Jun. 8, 2010

(54) ULTRA WIDEBAND RADIO FREQUENCY IDENTIFICATION TECHNIQUES

(75) Inventor: Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 11/560,037

(22) Filed: Nov. 15, 2006

(65) Prior Publication Data

US 2007/0069861 A1 Mar. 29, 2007

Related U.S. Application Data

(63) Continuation of application No. 11/024,642, filed on Dec. 30, 2004, now Pat. No. 7,154,396.

(51) Int. Cl.
*G08B 13/14* (2006.01)

(52) U.S. Cl. ............... 340/572.2; 340/572.1; 340/572.4

(58) Field of Classification Search ............. 340/572.1, 340/572.4, 572.7, 572.8, 539.1, 539.11, 539.3, 340/505, 10.1, 10.2, 10.3, 825.49, 10.5, 825.69, 340/572.2

See application file for complete search history.

(56) References Cited

U.S. PATENT DOCUMENTS

| | | |
|---|---|---|
| 5,677,927 A | 10/1997 | Fullerton et al. |
| 6,097,292 A | 8/2000 | Kelly et al. |
| 6,492,904 B2 | 12/2002 | Richards |
| 6,535,109 B1 | 3/2003 | Mahdavi |
| 6,639,509 B1 | 10/2003 | Martinez |
| 6,693,470 B1 | 2/2004 | Tiuraniemi |
| 6,707,376 B1 | 3/2004 | Patterson et al. |
| 6,750,757 B1 | 6/2004 | Gabig, Jr. et al. |
| 6,927,688 B2 | 8/2005 | Tice |
| 7,009,495 B2 | 3/2006 | Hughes et al. |
| 7,015,793 B2 | 3/2006 | Gabig et al. |
| 7,026,935 B2 | 4/2006 | Diorio et al. |
| 7,317,378 B2 * | 1/2008 | Jarvis et al. ................. 340/10.1 |
| 7,511,604 B2 * | 3/2009 | Raphaeli et al. ............ 340/10.2 |
| 2001/0001758 A1 | 5/2001 | Greeff et al. |
| 2006/0022800 A1 * | 2/2006 | Krishna et al. ............. 340/10.2 |
| 2006/0022801 A1 * | 2/2006 | Husak et al. ............... 340/10.5 |

(Continued)

FOREIGN PATENT DOCUMENTS

KR 20040040846 5/2004

OTHER PUBLICATIONS

International Search Report dated Aug. 17, 2006.

(Continued)

*Primary Examiner*—Van T. Trieu
(74) *Attorney, Agent, or Firm*—Locke Lord Bissell & Liddell

(57) ABSTRACT

Ultra wideband (UWB) techniques are applied to radio frequency identification (RFID). For instance, a reader generates a UWB IR interrogation signal, and receives a UWB IR reply signal from an RFID tag in response to the interrogation signal. In addition, the reader may generate from the UWB IR reply signal a baseband response sequence. This sequence includes at least a tag identifier. A reader may store at least a tag identifier. Upon receipt of a UWB IR interrogation signal, the tag obtains a plurality of clock pulses from the UWB IR interrogation signal. Based on the plurality of clock pulses, the reader transmits at least the tag identifier in a UWB IR response signal.

21 Claims, 14 Drawing Sheets

U.S. PATENT DOCUMENTS

2006/0022815 A1* 2/2006 Fischer et al. ............... 340/505
2006/0170565 A1* 8/2006 Husak et al. ........... 340/825.49
2006/0181393 A1* 8/2006 Raphaeli ................... 340/10.1
2007/0205867 A1* 9/2007 Kennedy et al. ........... 340/10.1

OTHER PUBLICATIONS

Marsden et al., "Low Power CMOS Re-programmable Pulse Generator for UWB Systems", Ultra Wideband Systems and Technologies, 2003, IEEE Conference, Nov. 16-19, 2003, pp. 443-447.

Stoica et al., "Low Complexity UWB Circuit Transceiver Architecture for Low Cost Sensor Tag Systems", Personal, Indoor and Mobile Radio Communications, 2004, PIMRC 2004 15th IEEE International Symposium, Sep. 5-8, 2004, vol. 1, pp. 196-2000.

Duo et al., "A D.C-13GHz LNA for UWB RFID Applications", Norchip Conference, 2004, Proceedings, Nov. 8-9, 2004, pp. 241-244.

Korena Office Action issued on Jun. 23, 2009 in KR Application No. KR 2009-7005949 by the Korean Patent Office.

* cited by examiner

ULTRA WIDEBAND RADIO FREQUENCY IDENTIFICATION TECHNIQUES

This is a continuation of prior application Ser. No. 11/024,642, filed Dec. 30, 2004, now allowed. The prior application is incorporated herein by reference in its entirety.

FIELD OF THE INVENTION

The present invention relates to wireless communications. More particularly, the present invention relates to techniques for performing radio frequency identification.

BACKGROUND OF THE INVENTION

Since gaining approval by the Federal Communications Commission (FCC) in 2002, ultra wideband (UWB) techniques have become attractive for short-range wireless communications because they allow devices to exchange information at relatively high data rates.

Although UWB systems for short-range networks are relatively new, their transmission techniques have been known for decades. In fact, the first radio transmission was made by a UWB technique when Heinrich Hertz discovered radio waves in 1887. This discovery was made with a spark gap transmitter, which can be considered an early UWB radio. Later on, such transmitters were banned because they emitted wide spectrum transmissions.

Current FCC regulations permit UWB transmissions for communications purposes in the frequency band between 3.1 and 10.6 GHz. However, for such transmissions, the spectral density has to be under −41.3 dBm/MHz and the utilized bandwidth has to be higher than 500 MHz.

There are many UWB transmission techniques that can fulfill these requirements. A common and practical UWB technique is called impulse radio (IR). In IR, data is transmitted by employing short baseband pulses that are separated in time by gaps. Thus, IR does not use a carrier signal. These gaps make IR much more immune to multipath propagation problems than conventional continuous wave radios. RF gating is a particular type of IR in which the impulse is a gated RF pulse. This gated pulse is a sine wave masked in the time domain with a certain pulse shape.

IR transmission facilitates a relatively simple transmitter design, which basically requires a pulse generator and an antenna. This design does not necessarily require a power amplifier, because transmission power requirements are low. In addition, this design does not generally require modulation components such as voltage controlled oscillators (VCOs) and mixers, because the impulses are baseband signals.

In general, IR receiver designs are more complex than their corresponding transmitter designs. However, these designs are much simpler than conventional receiver designs because they typically do not employ intermediate frequency (IF) signals or filters. However, to satisfy spectral requirements, IR impulses have to be very short in duration (e.g., a couple of nanoseconds). This requirement places stringent timing demands on receiver timing accuracy. The fulfillment of these demands can also provide IR receivers with accurate time resolution and positioning capabilities.

Radio frequency identification (RFID) technology involves a reader that utilizes electromagnetic energy to wirelessly solicit information from one or more tags that are either touching the reader or are within a predetermined range of the reader. This soliciting of information is referred to herein as an interrogation. Through an interrogation, a reader may receive tag identifiers (e.g., tag ID numbers) as well as other additional information. Thus, a reader can perform interrogations to determine the presence and identity of one or more tags. Currently, RFID systems employ carrier-based modulation techniques.

SUMMARY OF THE INVENTION

The present invention provides an apparatus having a transmitter portion and a receiver portion. The transmitter portion is configured to generate a UWB IR interrogation signal. Complementing the transmitter portion, the receiver portion is configured to receive a UWB IR reply signal from a radio frequency identification (RFID) tag in response to the interrogation signal.

The apparatus may further include a controller configured to generate a baseband interrogation sequence. From this sequence, the transmitter portion generates the UWB IR interrogation signal. Accordingly, the transmitter portion may include a digital-to-analog converter (DAC) that converts the baseband interrogation sequence into a baseband analog interrogation signal, and an impulse generator that converts the baseband analog interrogation signal into the UWB interrogation signal. Also, the transmitter portion may include an amplifier that amplifies the UWB interrogation signal.

The receiver portion of the apparatus may generate a baseband response sequence from the UWB reply signal. The baseband response sequence may include a tag identifier. Also, the baseband response sequence may further include tag data. Accordingly, the receiver portion may include a template generator configured to generate an impulse template signal, and a mixer configured to produce a baseband analog signal from the UWB reply signal and the impulse template signal. Also, the receiver portion may include an amplifier.

In addition, the apparatus may also include a host that is configured to send an initiate interrogation command to the controller across an interface. Also, the apparatus may include an antenna to wirelessly transmit the UWB IR interrogation signal.

The present invention also provides a tag having an antenna, a memory, a clock recovery module, and an antenna modulator. The antenna is configured to receive a UWB IR interrogation signal. The memory stores at least a tag identifier. The clock recovery module is configured to obtain a plurality of clock pulses from the UWB IR interrogation signal. The antenna modulator is configured to transmit at least the tag identifier through backscatter modulation of the UWB IR interrogation signal. The timing of this backscatter modulation is based on the plurality of clock pulses. The tag's memory may further store additional tag data. Also, the antenna modulator may be further configured to transmit the additional tag data through backscatter modulation of the UWB IR interrogation signal.

The tag may further include a power module configured to obtain operational power from transmissions, such as the UWB IR interrogation signal and/or signals transmitted by a remote wireless communications device.

In addition, the present invention provides a tag having an antenna, a memory, a clock recovery module, and a UWB IR transmitter. The antenna is configured to receive an UWB IR interrogation signal. The memory stores at least a tag identifier. The clock recovery module is configured to obtain a plurality of clock pulses from the UWB IR interrogation signal. The UWB IR transmitter is configured to transmit at least the tag identifier in response to the UWB IR interrogation signal. The timing of the backscatter modulation is based on the plurality of clock pulses. Further, the tag may include a power source that provides operational power to the UWB IR transmitter. This power source may include a battery.

The present invention further provides various methods. One such method includes storing at least a tag identifier, and receiving a UWB IR interrogation signal. The method obtains a plurality of clock pulses from the UWB IR interrogation signal. Based on the plurality of clock pulses, the method transmits at least the tag identifier in a UWB IR response signal.

A further method includes generating a UWB IR interrogation signal, and receiving a UWB IR reply signal from a radio frequency identification (RFID) tag in response to the interrogation signal. This method may also include generating a baseband response sequence from the UWB IR reply signal. The baseband response sequence includes a tag identifier. Also, the baseband response sequence may further include tag data.

The present invention further provides various computer program products. For instance, a computer program product of the present invention includes: (a) program code for enabling the processor to cause generation of an ultra wideband (UWB) impulse radio (IR) interrogation signal; and (b) program code for enabling the processor to receive a response sequence, wherein the response sequence is based on a UWB IR reply signal from a radio frequency identification (RFID) tag in response to the interrogation signal.

A further computer program product includes: (a) program code for enabling the processor to store at least a tag identifier; (b) program code for enabling the processor to obtain a plurality of clock pulses from an ultra wideband (UWB) impulse radio (IR) interrogation signal; and (c) program code for enabling the processor to cause transmission of at least the tag identifier in a UWB IR response signal.

Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. UWB Transmission

Figure 1:
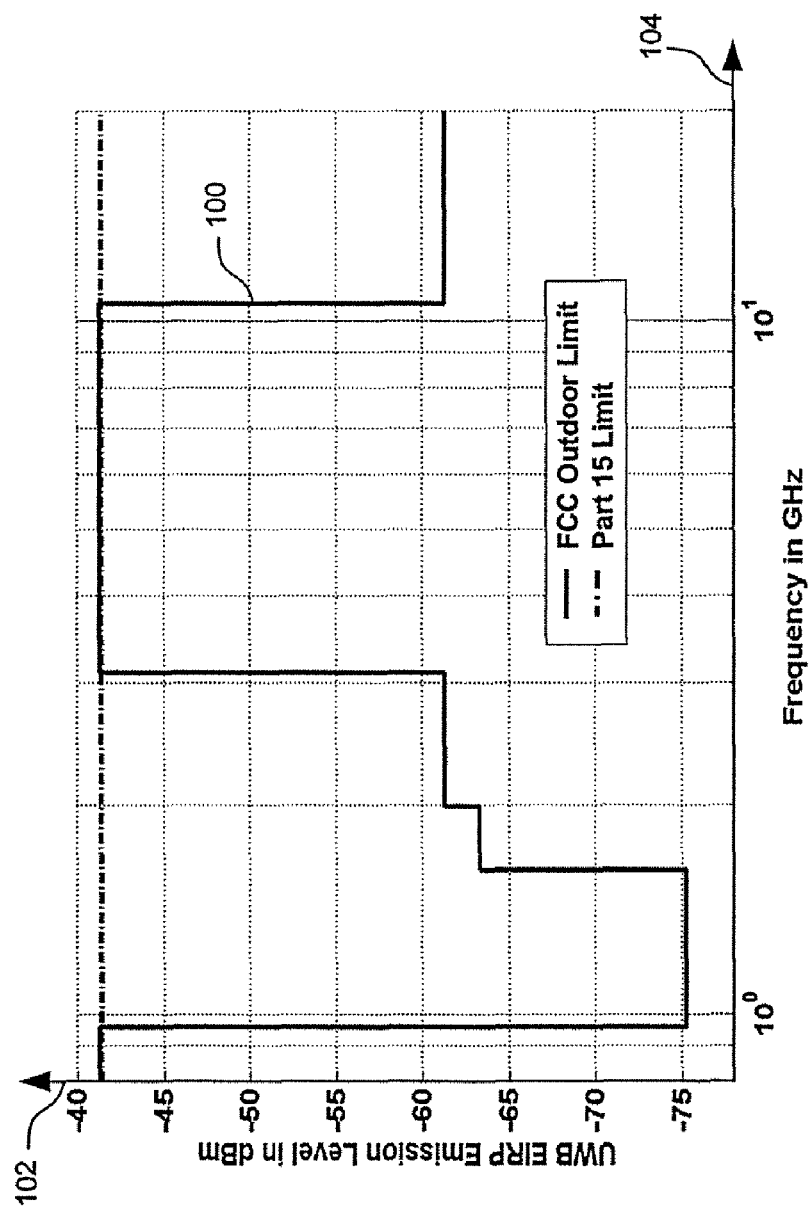
FIG. 1 is a diagram of an exemplary UWB spectral mask.

As stated above, current FCC regulations allow UWB communications within a frequency band between 3.1 and 10.6 GHz. FIG. 1 illustrates an exemplary spectral mask 100 for UWB IR signals that is compliant with this requirement. This mask may be employed in the generation of such signals. In particular, FIG. 1 is a graph having a power axis 102 and a frequency axis 104. In this graph, spectral mask 100 is represented as a relationship between effective isotropic radiated power (EIRP), which is plotted along axis 102, and frequency in gigahertz, which is plotted along axis 104.

Figure 2:
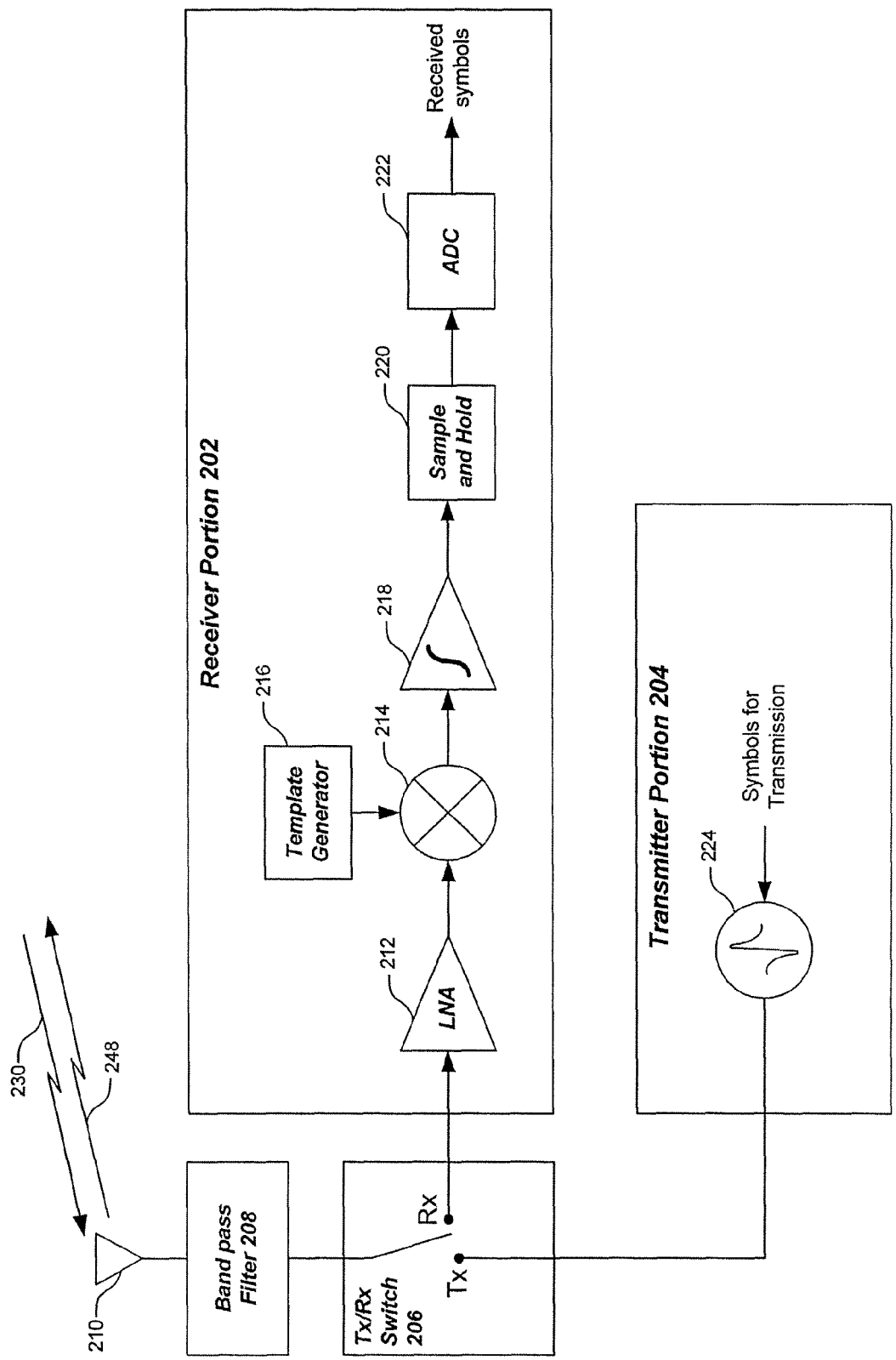
FIG. 2 is a block diagram of an exemplary UWB transceiver.

FIG. 2 is a block diagram of an exemplary UWB transceiver. This transceiver includes a receiver portion 202, a transmitter portion 204, a transmit/receive switch 206, a band pass filter 208, and an antenna 210.

Antenna 210 exchanges wireless UWB signals with remote devices. For instance, FIG. 2 shows antenna 210 receiving an incoming wireless UWB signal 230, and transmitting an outgoing wireless UWB signal 248.

Band pass filter 208 is configured to remove signal energy that is outside of the spectrum allocated to UWB communications. For instance, band pass filter 208 may filter out energy that is not between 3.1 GHz and 10.6 GHz. This filtering may be performed for both incoming and outgoing transmissions.

FIG. 2 shows that switch 206 has a first setting (shown as Rx), and a second setting (shown as Tx). The first setting allows the reception of UWB transmissions, while the second setting allows the transmission of UWB transmissions.

As shown in FIG. 2, receiver portion 202 includes a low noise amplifier (LNA) 212, a mixer 214, a template generator 216, an integrator 218, a sample and hold module 220, and an analog to digital converter (ADC) 222. Accordingly, when switch 206 is in its first (Rx) setting, LNA 212 receives (via switch 206) a filtered UWB signal from band pass filter 208. From this signal, LNA 212 generates an amplified UWB signal, which is passed to mixer 214.

Mixer 214 mixes the amplified UWB signal with a template generated by template generator 216. This template is based on the impulse waveform employed in the system. Accordingly, mixer 214 operates to identify impulses from electromagnetic energy. Integrator 218 accumulates the output of mixer 214 to generate an analog value. Sample and hold module 220 receives this value and generates a decision value, which is converted to a digital value by ADC 222. As a result, ADC 222 may produce a stream of digital symbols.

In contrast, when switch 206 is in its second (Tx) setting, UWB impulses are sent from an impulse generator within transmitter portion 204 to band pass filter 208. These impulses are based on symbols received from a symbol source (not shown). Band pass filter 206 filters these impulses and passes them to antenna 210 for wireless transmission as UWB signal 248.

II. Radio Frequency Identification

Figure 3:
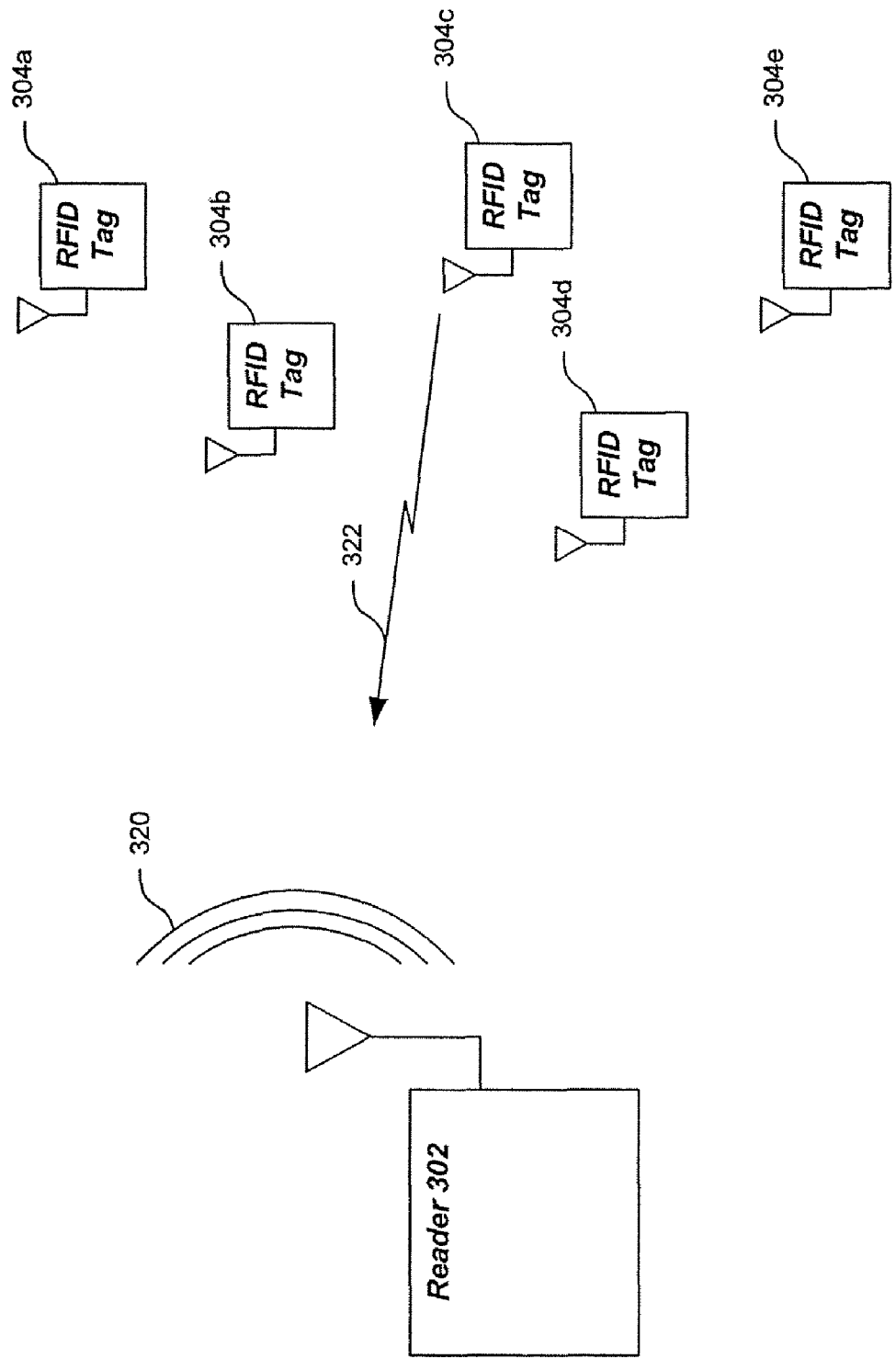
FIG. 3 is a diagram of an exemplary RFID system.

FIG. 3 is a diagram of an RFID system having an RFID reader 302, and a plurality of RFID tags 304.

As shown in FIG. 3, RFID reader 302 generates and transmits an interrogation signal 320. This signal is received by one or more of tags 304. In response, each tag 304 that receives interrogation signal 320 generates a corresponding reply signal that is sent to reader 302. For example, FIG. 3 shows tag 304c generating a reply signal 322. Reply signal 322 includes at least tag identification information (such as a tag ID number). In addition, reply signal 322 may include other information such as, for example, data specific to the tag's location or environment.

A reader may transmit interrogation signals in the form of clock pulses that provide receiving tags with a guide for communicating (i.e., for transmitting reply signals) back to the reader. These reply signals may involve backscatter reflections of the interrogation signals. Examples of such backscatter reflections are described in greater detail below with reference to FIG. 7.

Figure 4:
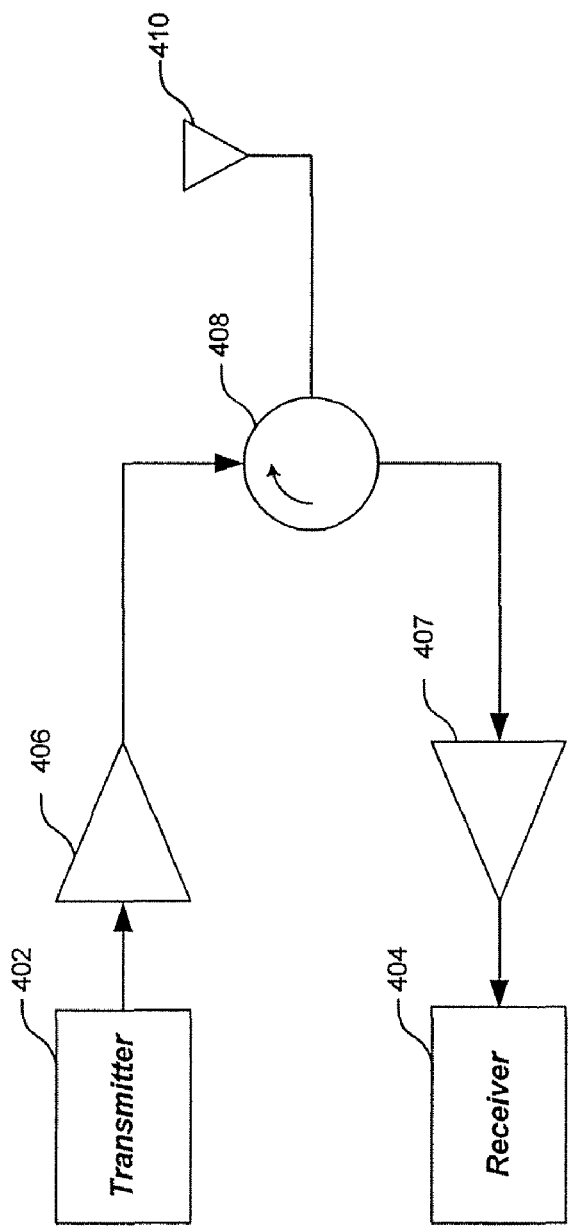
FIG. 4 is a diagram of a conventional RFID reader implementation.
Figure 5:
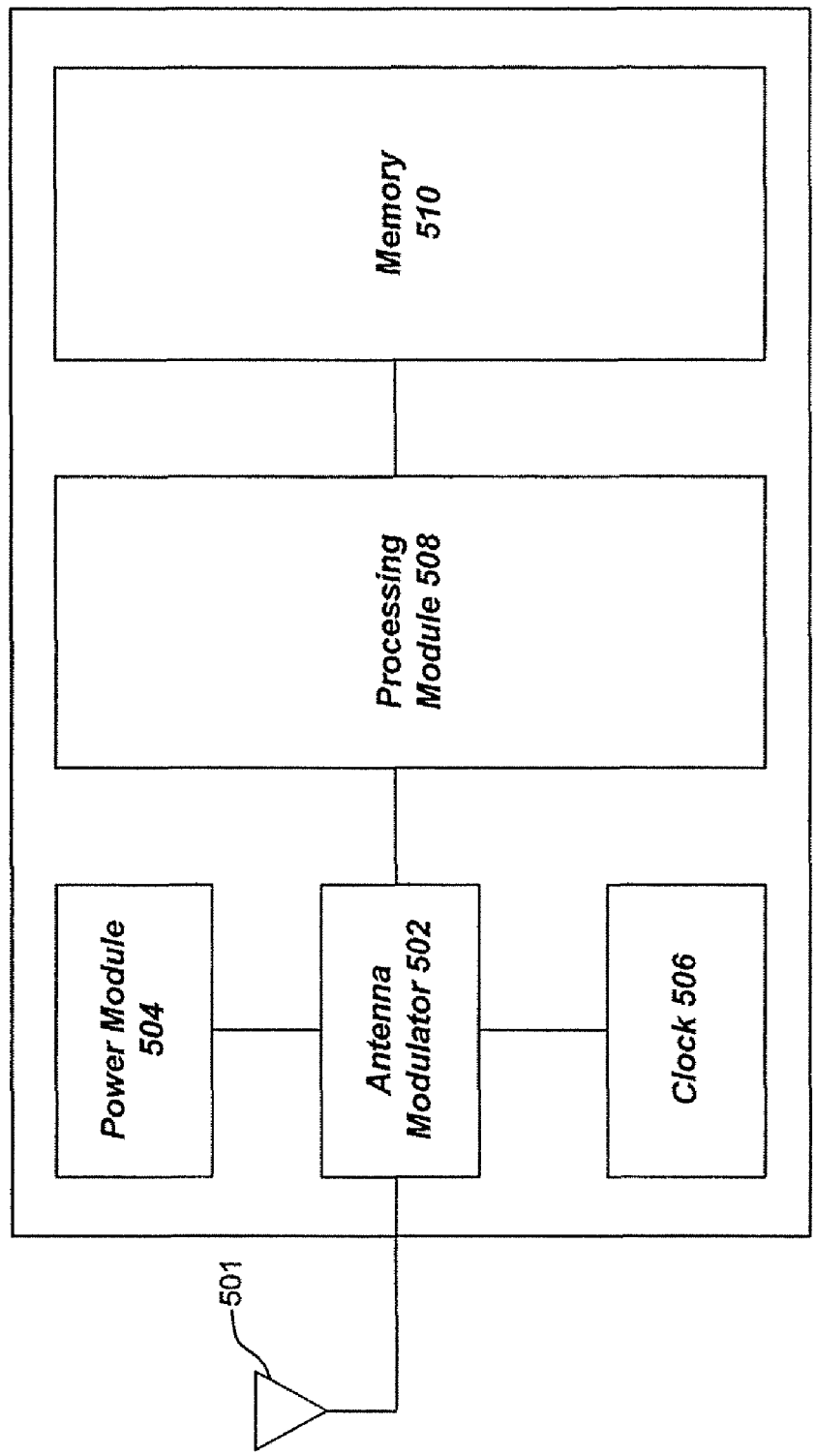
FIG. 5 is a diagram of a conventional RFID tag implementation.

Conventional reader and tag implementations are shown in FIGS. 4 and 5. For instance, FIG. 4 is a diagram showing an implementation of a conventional RFID reader. This implementation includes a transmitter 402, a receiver 404, amplifiers 406 and 407, a circulator 408, and an antenna 410.

Transmitter 402 generates interrogation signals for transmission to one or more RFID tags. These interrogation signals are amplified by amplifier 406 and wirelessly transmitted by antenna 410. Receiver 404 receives reply signals from one or more RFID tags. These reply signals are initially received by antenna 410 and amplified by amplifier 407. Both transmitter 402 and receiver 404 employ continuous carrier-based modulation techniques to generate RF signals from baseband data, and to obtain baseband data from received RF signals.

Circulator 408 provides isolation between transmitted and received signals. In particular, circulator 408 directs signals outputted by amplifier 406 to antenna 410 for transmission, while preventing (or substantially preventing) these signals from being passed to receiver 404. In addition, circulator 408 directs wireless signals received by antenna 410 to amplifier 407 for reception by receiver 404, while preventing (or substantially preventing) such signals from being passed to the output terminal of amplifier 406.

FIG. 5 is a diagram showing an implementation of a conventional RFID tag. This implementation includes an antenna 501, an antenna modulator 502, a power module 504, a clock 506, a processing module 508, and a memory 510.

Antenna modulator 502 controls one or more properties of antenna 501, such as its impedance. This enables the tag to reflect or absorb reader-initiated transmissions. Such reflections or absorptions are used to convey information (i.e., symbols such as binary bits) in response to interrogation signals. Antenna modulator 502 may cause such reflections and absorptions to occur in response to particular portions of interrogation signals (such as clock pulses).

Power module 504 provides power to tag components. For instance, power module 504 may include electronics (such as coil(s), rectifier(s), and/or capacitor(s)) to harvest energy from electromagnetic transmissions. Such transmissions may include reader-initiated interrogation signals and/or transmissions from wireless communications devices.

Clock 506 provides timing information that governs the performance of other tag components. For instance, clock 506 may control the timing in which antenna modulator 502 varies the impedance of antenna 501.

Processing module 508 controls device operation. As shown in FIG. 5, processing module 508 is coupled to memory 510. Processing module 508 may be implemented with one or more microprocessors that are each capable of executing software instructions stored in memory 510, for example, as a computer system.

Memory 510 stores information in the form of data and software components (also referred to herein as modules). This data includes information for transmission to readers, such as a tag ID and tag data. These software components include instructions that can be executed by processing module 508. Various types of software components may be stored in memory 510. For instance, memory 510 may store software components that control the generation of tag data. Memory 510 may be implemented with random access memory (RAM), read only memory (ROM), and/or flash memory.

Tags may exchange information with a reader in a manner that involves the reader issuing an interrogation signal having multiple clock pulses. In response, the tags send information (e.g., tag identifiers and/or data) to the reader. The manner in which this information is sent to the reader is guided by these clock pulses.

Figure 6A:
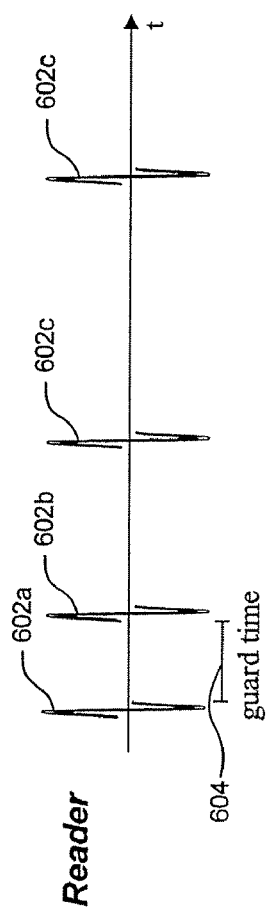
FIGS. 6A and 6B are diagrams of exemplary UWB clock pulses according to embodiments of the present invention.
Figure 6B:
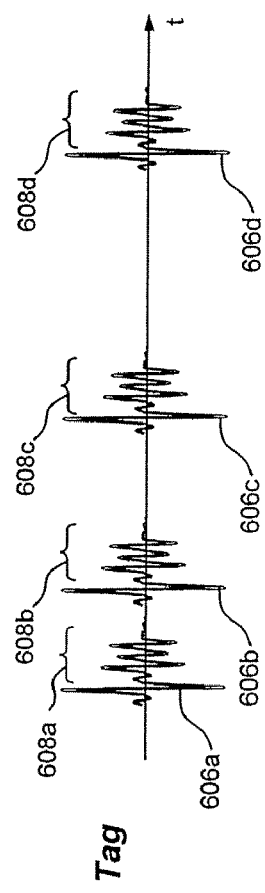

FIGS. 6A and 6B are diagrams showing an exemplary set of UWB clock pulses that may be transmitted by a reader according to embodiments of the present invention. In particular, FIG. 6A shows the pulses from the perspective of the reader, and FIG. 6B shows the pulses from the perspective of a receiving tag. Referring to FIG. 6A, a reader generates a series of UWB pulses 602. A guard time 604 separates adjacently transmitted pulses 602. FIG. 6B shows received pulses 606. Each of these received pulses corresponds to a transmitted pulse 602. As shown in FIG. 6B, each received pulse 606 has a delay spread 608, which is caused by multipath propagation.

Referring again to FIG. 5, the illustrated tag implementation includes a power module 504. The features of this component are based on the tag's architecture. Various tag architectures exist, such passive, semi-passive, and active.

A passive tag receives its power from a reader's interrogation signal. A semi-passive tag is similar to a passive tag in that it receives power from a reader's interrogation signal. However, a semi-passive tag also has its own power supply (such as a battery) to provide energy for various other tag functions.

Figure 8:
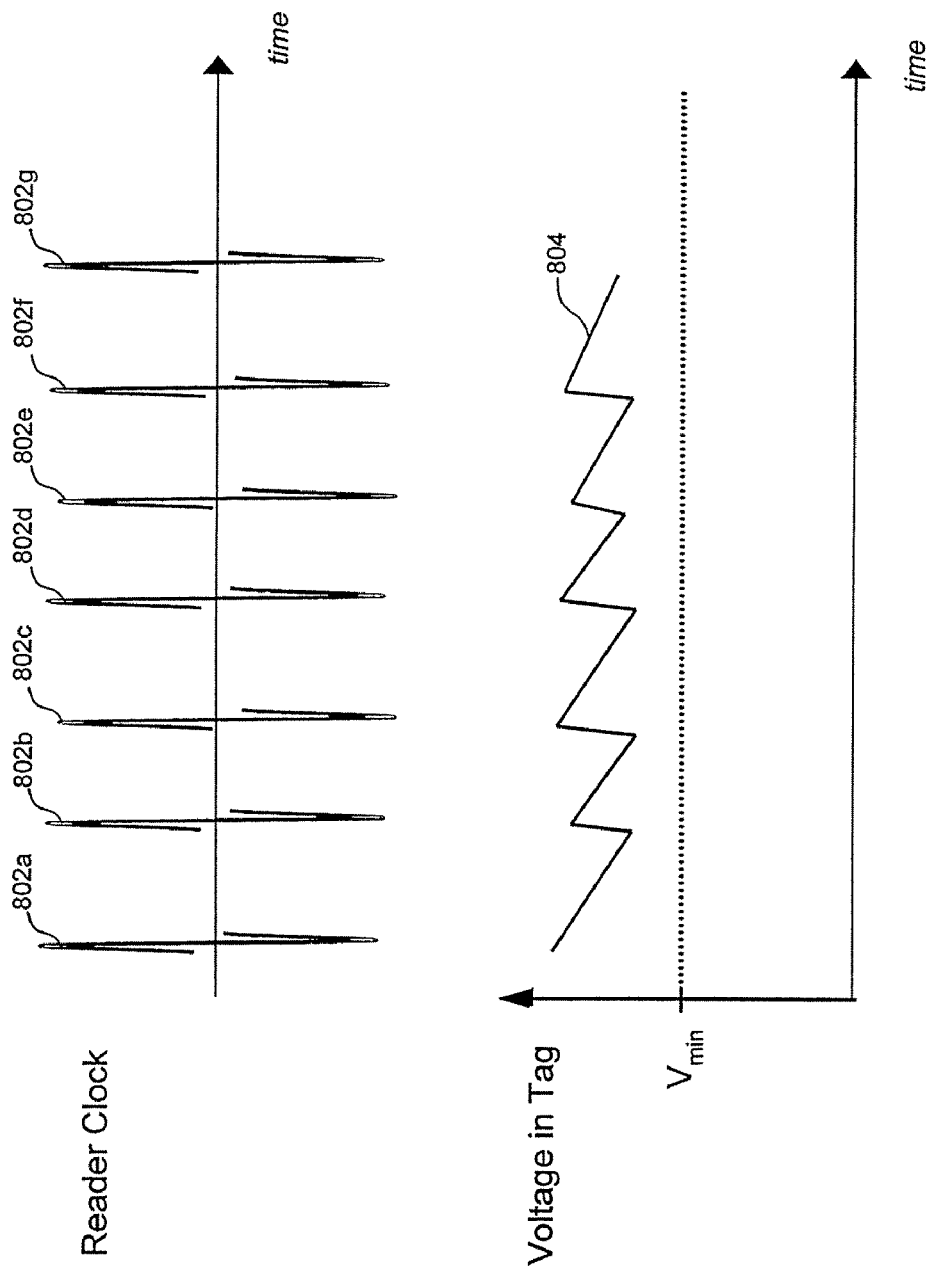
FIG. 8 is a diagram showing an exemplary relationship between an interrogation signal and a passive tag's operating voltage.

An example of power transfer for passive and semi-passive tags is shown in the graphs of FIG. 8. These graphs illustrate a relationship between an interrogation signal and a passive tag's operating voltage. In particular, FIG. 8 shows an interrogation signal composed of a series of pulses 802. In addition to conveying information, each of these pulses transfers energy. Accordingly, FIG. 8 shows a tag's operating voltage 804 increasing with the receipt of each pulse 802. This voltage then gradually decays until receipt of a subsequent pulse 802. Despite such fluctuations, FIG. 8 shows that voltage 804 is maintained above the tag's minimum required operational voltage ($V_{min}$). Therefore, the tag may continually operate during the conditions of FIG. 8.

Figure 9:
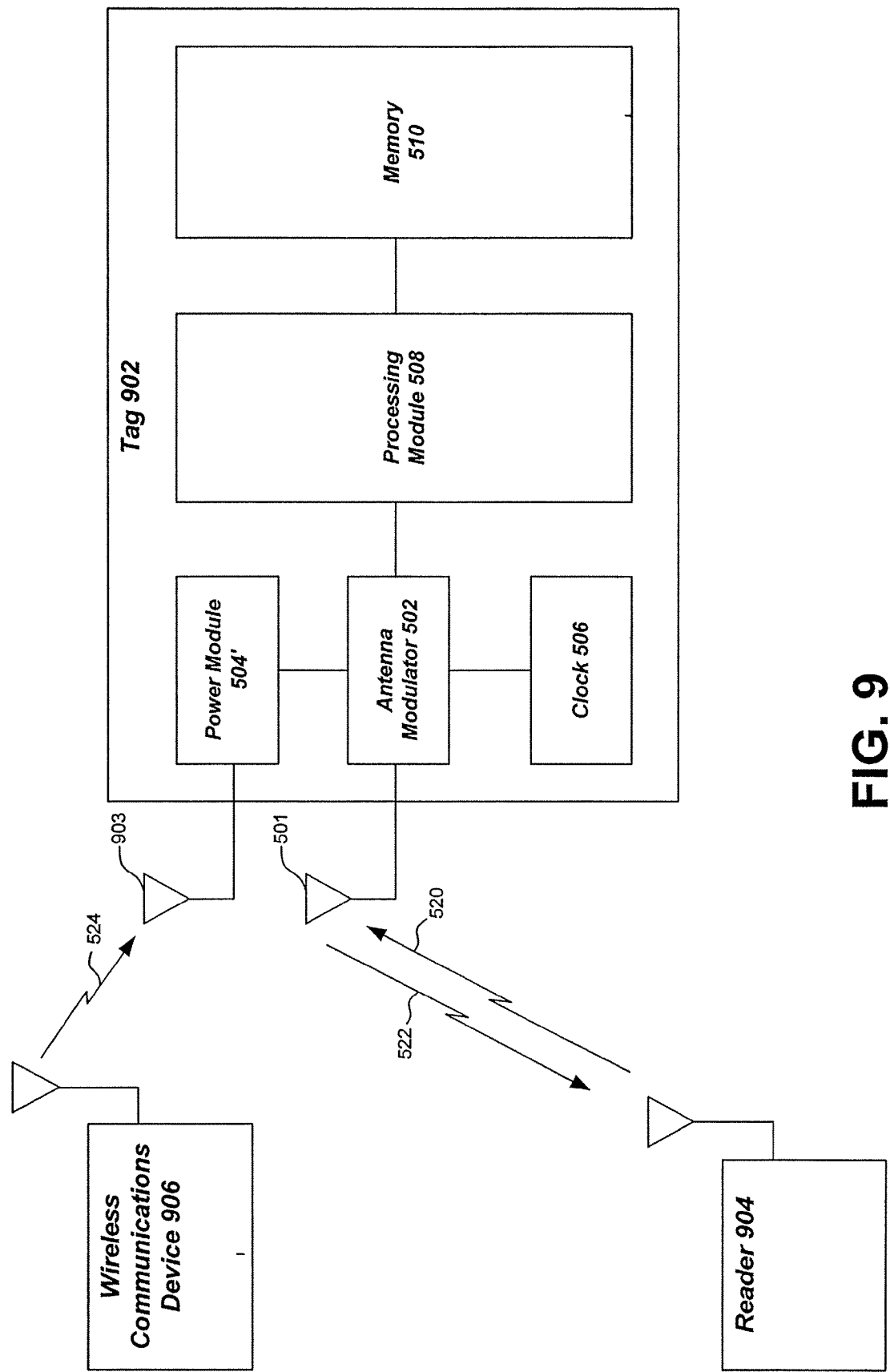
FIG. 9 is a diagram showing a passive tag receiving operational power through transmissions from a device other than a reader.

As an alternative, a passive or semi-passive tag may receive power from transmissions originated by a device other than a reader. For example, FIG. 9 shows a tag 902 receiving an interrogation signal 920 from a reader 904 and responding to the reader with a reply 922. However, instead of receiving operational power through interrogation signal 920, tag 902 receives power from a wireless communications device 906, such as a Bluetooth radio. Receiving power from such a device may provide passive tag 902 with a more stable supply voltage.

As shown in FIG. 9, tag 902 is similar in implementation to the tag of FIG. 5. However, tag 902 includes a power module 504' that is coupled to an antenna 903. Antenna 903 receives transmissions from device 906 and passes them to power module 504' for the generation of power.

Unlike a passive tag or a semi-passive tag, an active tag includes a power supply, such as a battery, to provide the tag with its operational power. This operational power includes power to generate and send reply signals to readers.

Figure 7:
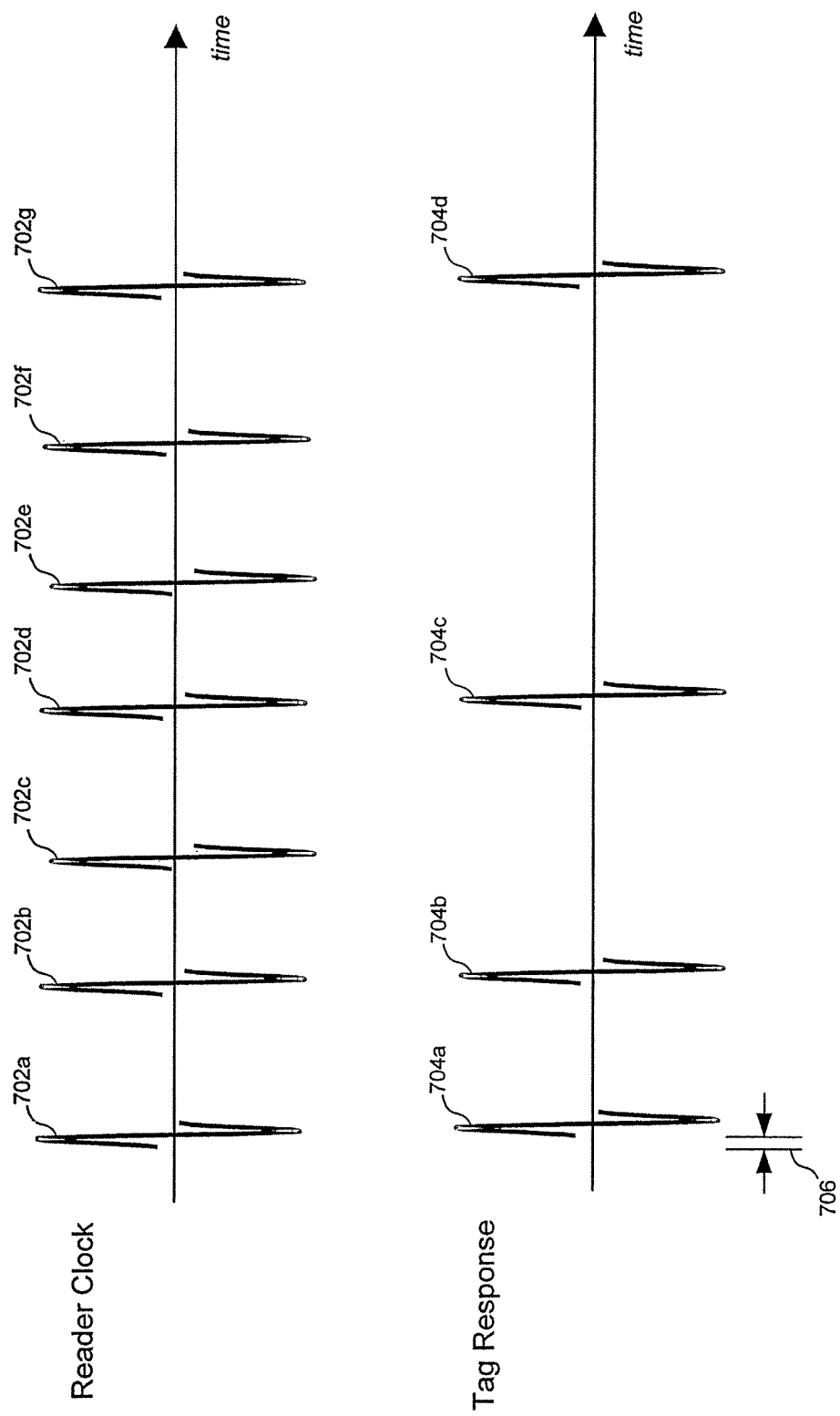
FIG. 7 is a diagram illustrating a relationship between clock pulses and tag transmissions.

As described above, tags (passive, semi-passive, and active) may receive interrogation signals in the form of clock pulses. These clock pulses provide a guide for transmitting responses back to the reader. In particular, reader-originated clock pulses may control the timing of tag transmissions. FIG. 7 is a diagram illustrating an exemplary relationship between a reader's clock pulses and a tag's transmissions. This relationship may apply to passive, semi-passive, and active tags.

In particular, FIG. 7 shows multiple clock pulses 702 that are transmitted by a reader. For each of these pulses, a receiving tag may transmit responsive information back to the reader. This responsive information may convey one or more symbols (such as a binary bit). As described above, the tag may respond to interrogation signals through backscatter reflections. Such reflections are caused by the tag changing or modulating one or more of its properties (such as its antenna impedance) during receipt of a corresponding clock pulse 702.

For example, FIG. 7 shows multiple reflections 704. Each of these reflections corresponds to a particular clock pulse 702. In particular, reflection 704a corresponds to clock pulse 702a, reflection 704b corresponds to clock pulse 702b, reflection 704c corresponds to clock pulse 702d, and reflection 704d corresponds to clock pulse 702g.

Pulses 702 and 704 are shown from the perspective of the reader. As shown in FIG. 7, a time offset 706 exists between each transmitted pulse 702 and its corresponding reflection 704. Time offset 706 is determined by the propagation delay between the reader and the tag. Therefore, time offset 706 varies according to the distance between these devices. For instance, at short distances, pulses 702 and 704 may overlap in time.

III. Impulse Radio RFID

Embodiments of the present invention utilize impulse radio for RFID systems. For instance, short impulse(s) may be transmitted from an RFID reader to form an interrogation signal. Thus, one or more tags receive an ultra wideband impulse radio interrogation signal. Such impulses (or portions thereof) may be selectively reflected by tag(s) back to the reader. This allows for information to be conveyed to the reader. Examples of such information include tag identifiers (e.g., tag ID numbers) and other tag data. Tags may generate such reflections by modulating their parameters during receipt of the impulses. Therefore, these reflections are also UWB signals.

Embodiments of the present invention advantageously provide for enhanced separation at the reader between transmitted interrogation signals and reader response signals. This is because UWB impulse radio employs pulses of relatively short duration. Thus, transmitted and received pulses can be easily separated in time. However, if the distance between a reader and a tag is sufficiently short, then transmitted interrogation signals and reader response signals may overlap in time at the reader. Isolation between these signals is not a big problem if this occurs because the difference between transmitted and received power is low due to short distance. Thus, high isolation between transmitted and received signals is not required and simple isolation techniques can be used.

Accordingly, embodiments of the present invention work well for both long and short distances. Moreover, embodiments of the present invention do not require readers to include costly and complicated circulators.

Figure 10:
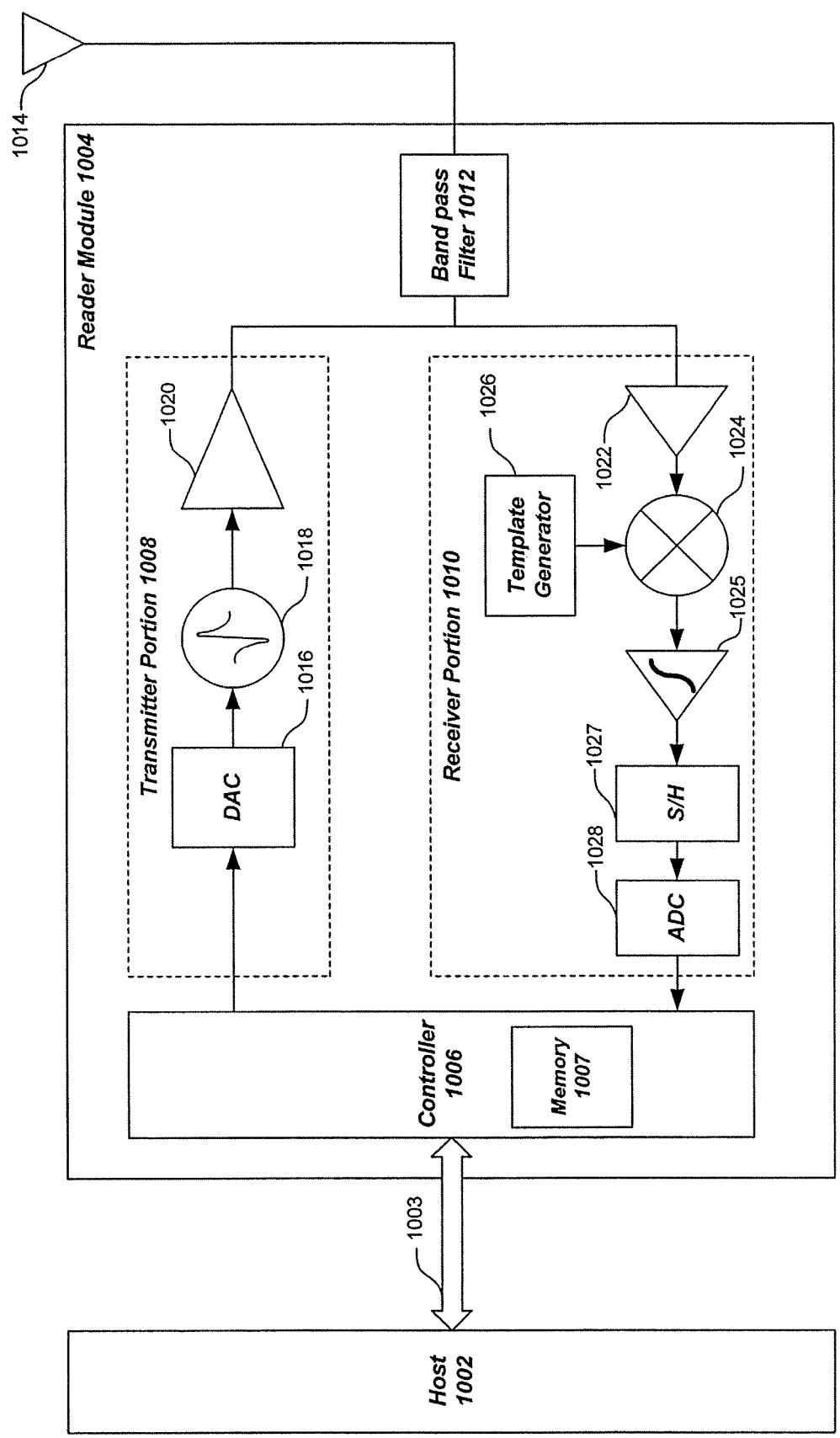
FIG. 10 is a block diagram of a reader, according to an embodiment of the present invention.

FIG. 10 is a block diagram of a reader, according to an embodiment of the present invention. This reader includes a host 1002, a control interface 1003, and an RFID module 1004. As shown in FIG. 10, RFID module 1004 includes a controller 1006, a transmitter portion 1008, a receiver portion 1010, a band pass filter 1012, and an antenna 1014.

Host 1002 controls the reader. In particular, host 1002 issues commands that are sent to RFID module 1004 across control interface 1003. Such commands may include an initiate interrogation command that directs RFID module 1004 to initiate tag interrogations. In addition, host 1002 may receive interrogation results from RFID module 1004 via control interface 1003. Examples of such results include identifiers of interrogated tags (e.g., tag ID numbers) and additional tag data received through tag interrogation.

Commands that RFID module 1004 receives from host 1002 are handled by controller 1006. Controller 1006 handles the general operation of RFID module 1004. This includes controlling transmitter portion 1008 and receiver portion 1010. Controller 1006 may be implemented with one or more processors (e.g., microprocessor(s) and/or microcontroller(s)) that are each capable of executing software instructions stored in memory 1007 (a computer program product). Accordingly, controller 1006 may operate with other components of FIG. 10 as a computer system.

In addition to storing instructions, memory 1007 may include information for transmission to tags, such as a predetermined baseband tag interrogation sequence. Further, memory 1007 may include information received from tags, such as tag identifiers and accompanying tag data. This received information may be passed to host 1002 via control interface 1003 upon completion of an interrogation.

Memory 1007 may be onboard the processor(s). Alternatively or additionally, memory 1007 may include a separate storage medium. Such a separate medium may be coupled to the processor(s) by, for example, a computer system bus. Memory 1007 may be implemented with random access memory (RAM), read only memory (ROM), and/or flash memory.

In response to a directive from host 1002, controller 1006 may initiate an RFID interrogation by generating a digital baseband interrogation sequence. This sequence includes one or more predetermined symbols (e.g., bits) employed during a tag interrogation.

As shown in FIG. 10, transmission portion 1008 includes a digital to analog converter (DAC) 1016, an impulse generator 1018, and a power amplifier 1020. DAC 1016 receives the baseband sequence from controller 1006 and generates a corresponding baseband analog interrogation signal, which is sent to impulse generator 1018. Based on symbols conveyed by this analog signal, impulse generator 1018 produces a corresponding UWB IR modulated signal, which includes one or more impulse waveforms. Unlike the generation of modulated signals in conventional RFID readers, the generation of such impulse waveforms does not employ continuous carrier-based techniques.

The employment of power amplifier 1020 is optional. However, if desired, power amplifier 1020 may be used to increase the modulated signal's power before it is passed to band pass filter 1012. Band pass filter 1012 filters out energy in the modulated signal that is outside of the spectrum allocated to UWB communications. For instance, band pass filter 1012 may filter out energy that is not between 3.1 GHz and 10.6 GHz. Accordingly, band pass filter 1012 passes a filtered UWB signal to antenna 1014 for wireless transmission.

In addition, band pass filter 1012 receives a UWB signal from antenna 1014 that is originated (e.g., backscattered) by a tag. Band pass filter 1012 filters this signal and passes it to receiver portion 1010. As shown in FIG. 10, receiver portion 1010 includes a low noise amplifier (LNA) 1022, a mixer 1024, an integrator 1025, a template generator 1026, a sample and hold module 1027, and an analog-to-digital converter (ADC) 1028.

LNA 1022 amplifies the received signal and passes it to mixer 1024, which mixes the received signal with a template generated by template generator 1026. This template is based on the impulse waveform employed in the system. Accordingly, mixer 1024 operates to identify impulses from electromagnetic energy. Integrator 1025 accumulates the output of mixer 1024 to generate analog values. Sample and hold module 1027 receives these values and generates decision values. These decision values are converted to digital symbols by ADC 1028. Like transmitter portion 1008, receiver portion 1007 does not rely on continuous carrier-based techniques to obtain these digital symbols.

Figure 11:
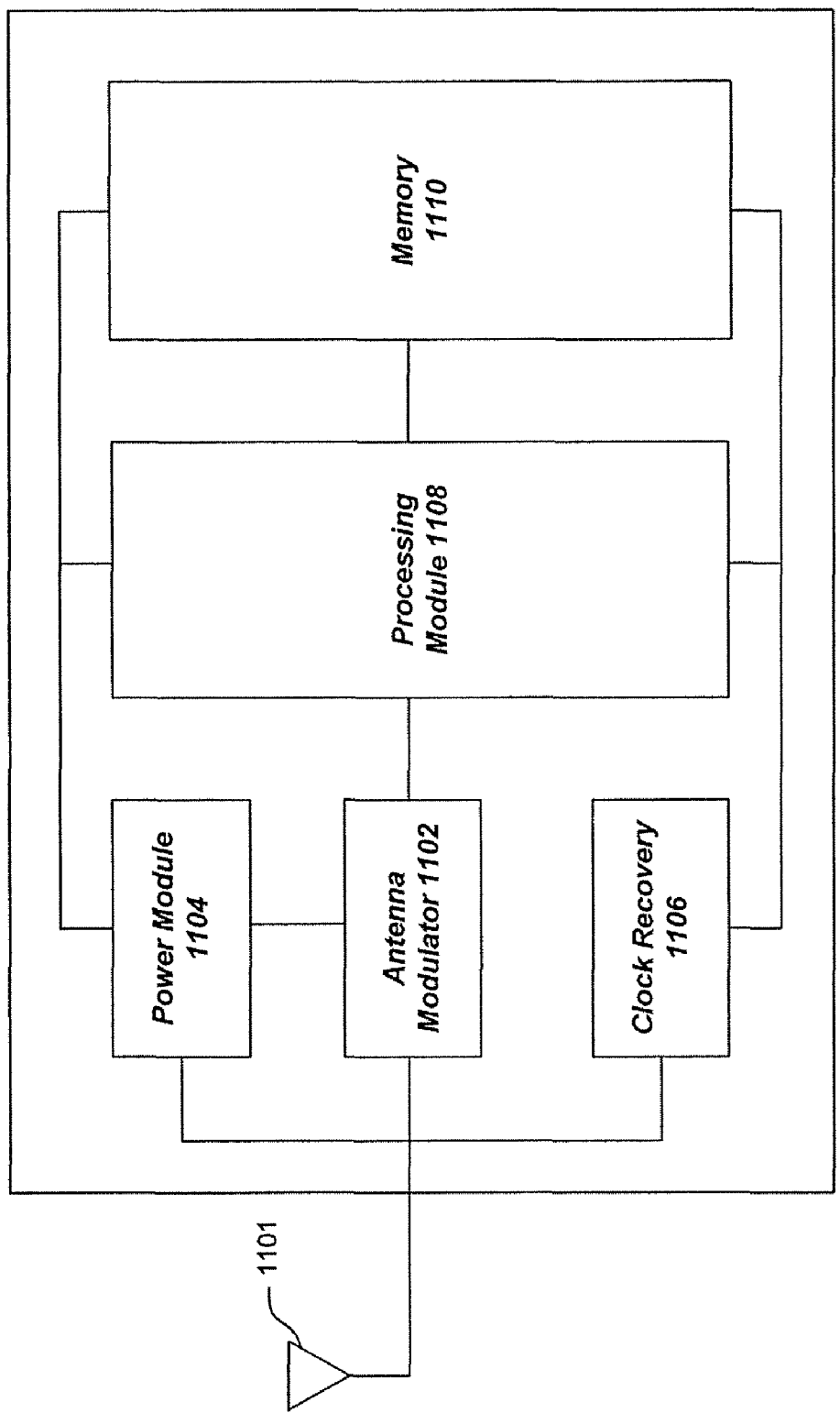
FIGS. 11 and 12 are block diagrams of tag implementations, according to embodiments of the present invention.

FIG. 11 is a block diagram of a tag implementation, according to an embodiment of the present invention. This implementation includes an antenna 1101, an antenna modulator 1102, a power module 1104, a clock recovery module 1106, a processing module 1108, and a memory 1110.

Antenna modulator 1102 controls one or more properties of antenna 1101, such as its impedance. This enables the tag to reflect or absorb reader-initiated transmissions. Such reflections or absorptions are used to convey information (i.e., symbols such as binary bits) in response to interrogation signals. Antenna modulator 1102 may cause such reflections and absorptions to occur in response to particular portions of interrogation signals (such as clock pulses). Accordingly, antenna modulator may include electronics to vary the impedance of antenna 1101. In embodiments, such variations are performed in response to commands received from processing module 1108.

Power module 1104 provides power to tag components. For instance, power module 1 104 may include electronics (such as coil(s), rectifier(s), and/or capacitor(s)) to harvest energy from electromagnetic transmissions. Such transmissions may include reader-initiated interrogation signals and/or transmissions from wireless communications devices. In alternative implementations, power module 1104 may include a power supply, such as a battery, to provide the tag with some or all of its operational power. Accordingly, this tag may be implemented according to passive, semi-passive, or active architectures.

Clock recovery module 1106 generates timing information based on pulses (i.e., interrogation signal(s)) received from a reader. Accordingly, clock recovery module 1106 may include a UWB IR receiver. This receiver may be implemented as receiver portion 1010 or in other ways apparent to persons skilled in the relevant art(s).

This timing information governs the performance of other tag components. For instance, clock recovery module 1106 controls the timing in which antenna modulator 1102 varies the impedance of antenna 1101. This may be performed through processing module 1108.

Processing module 1108 controls device operation. This includes controlling the timing and backscattering operation of antenna modulator 1102 based on information received from clock recovery module 1106.

As shown in FIG. 11, processing module 1108 is coupled to memory 1110. Processing module 1108 may be implemented with one or more microprocessors that are each capable of executing software instructions stored in memory 1110 (a computer program product). Accordingly, processing module may operate with other tag components as a computer system. Alternatively, processing module 1108 may be implemented with dedicated logic (e.g., as a state machine).

Memory 1110 stores information in the form of data and software components (also referred to herein as modules). This data includes information for transmission to readers, such as a tag ID and tag data. These software components include instructions that can be executed by processing module 1108. Various types of software components may be stored in memory 1110. For instance, memory 1110 may store software components that control the generation of tag data. Memory 1110 may be implemented with random access memory (RAM), read only memory (ROM), and/or flash memory.

Moreover, information (e.g., data and/or software components) stored by memory 1110 may be received from a reader. This may be in the form of a write command received by a reader. Such commands may be handled by processing module 1108 operating in conjunction with clock recovery module 1106.

Figure 12:
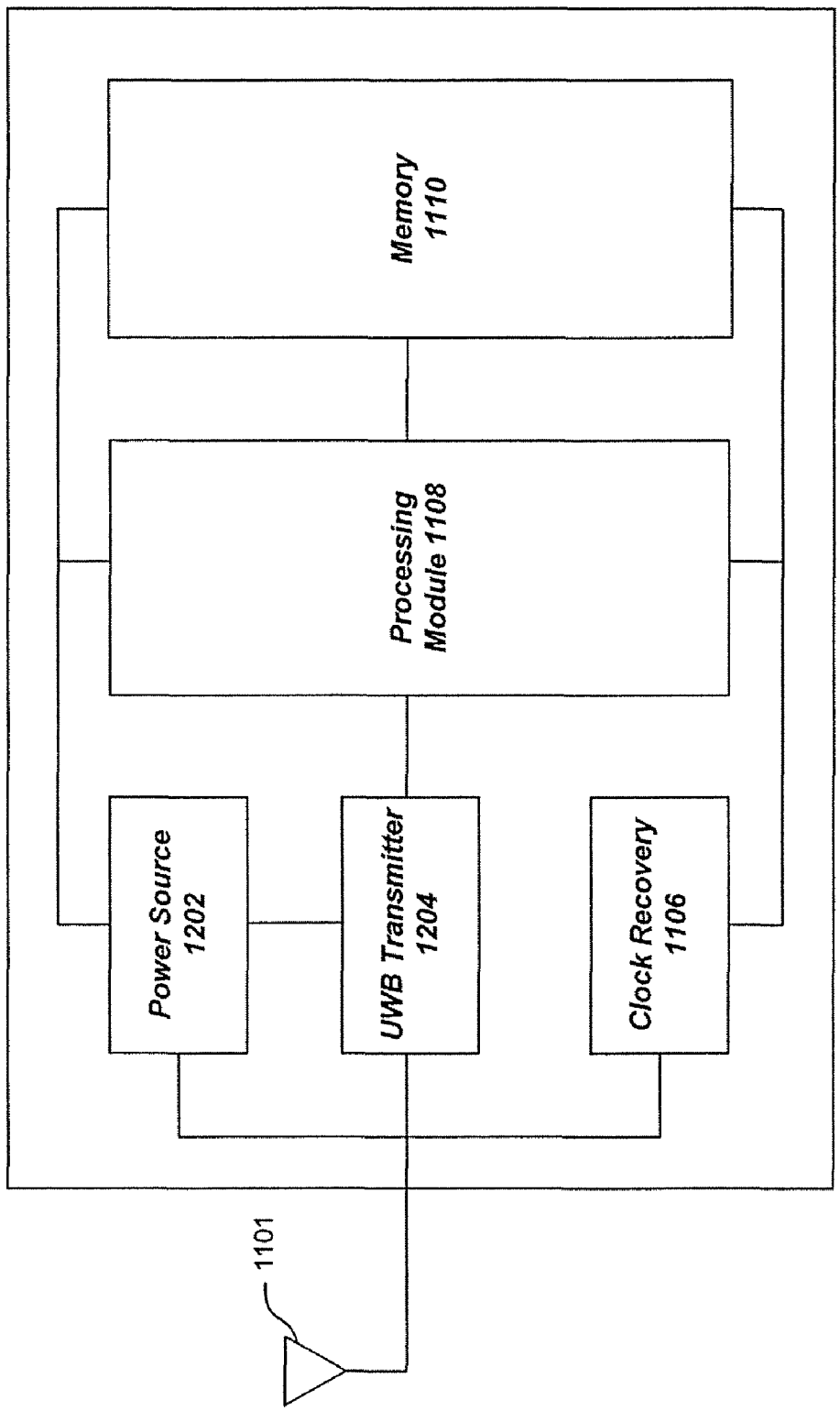

As described above, RFID tags according to embodiments of the present invention may employ active architectures. FIG. 12 is a diagram illustrating an exemplary implementation of such a tag. This tag is similar to the tag implementation of FIG. 11. However, power module 1104 is replaced with a power source 1202 such as a battery. Also, antenna modulator 1102 is replaced with a UWB IR transmitter 1204. Like the tag of FIG. 11, the tag of FIG. 12 responds to interrogation signals based on the timing of their pulses. However, the tag of FIG. 12 generates UWB IR pulses (and not backscatter reflections) to respond to interrogation signals. In embodiments, UWB IR transmitter 1204 may be implemented as transmitter portion 1008 or in other ways apparent to persons skilled in the relevant art(s).

IV. Operation

Figure 13:
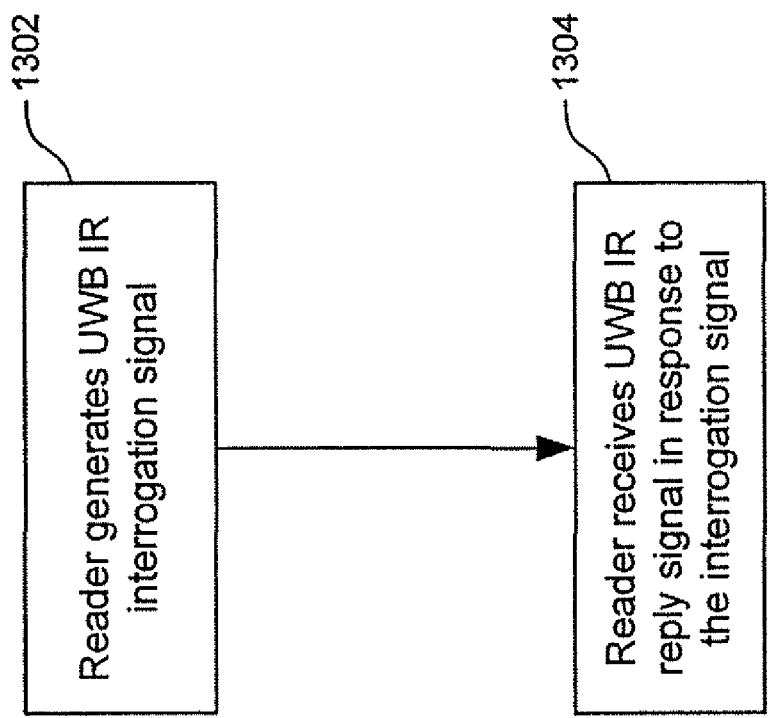
FIGS. 13 and 14 are flowcharts of operations, according to embodiments of the present invention.

FIG. 13 is a flowchart showing an operation according to embodiments of the present invention. This operation may be performed by readers, such as the reader of FIG. 10. However, this operation is may be employed by other readers.

As shown in FIG. 13, the reader generates a UWB IR interrogation signal in a step 1302. As described herein, this interrogation signal may be generated from a baseband interrogation sequence.

In a step 1304, the reader receives a UWB IR reply signal from a RFID tag in response to the interrogation signal. A baseband response sequence is generated from the UWB IR reply signal. This response sequence may include a tag identifier. In addition, this baseband response sequence may include additional tag data.

Figure 14:
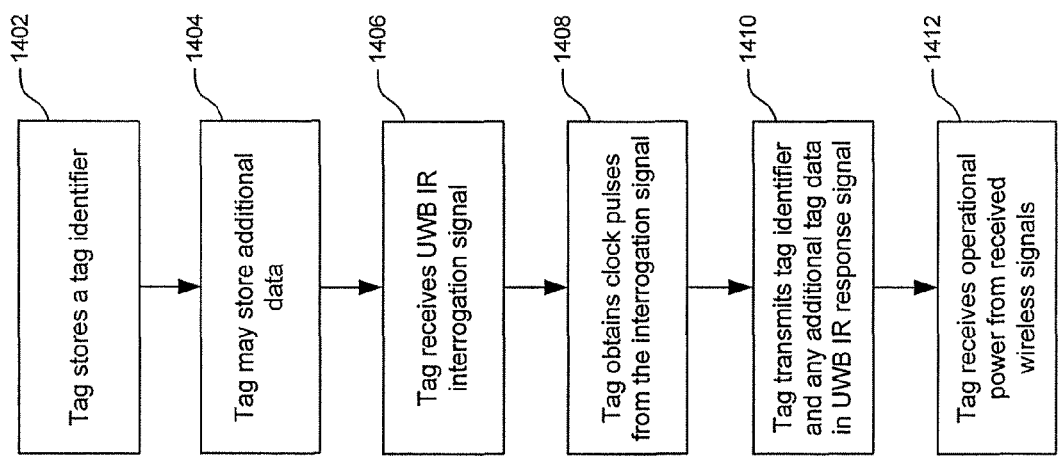

FIG. 14 is a flowchart showing an operation of a tag, such as the tags of FIGS. 11 and 12. However, this operation may be performed by other tags. As shown in FIG. 14, this operation includes a step 1402, in which the tag stores at least a tag identifier. In a step 1404, the tag may further store additional tag data.

In a step 1406, the tag receives a UWB IR interrogation signal. From this signal, the tag obtains a plurality of clock pulses in a step 1408.

In a step 1410, the tag transmits at least the tag identifier and optionally any stored tag data in a UWB IR response signal. The timing of this signal may be based on the plurality of clock pulses. In embodiments, step 1410 comprises performing backscatter modulation on the UWB IR interrogation signal.

In a step 1412, the tag receives operational power from received wireless signals. These signals may include the UWB IR interrogation signal and/or signals transmitted by a remote wireless communications device.

V. Conclusion

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. For instance, the present invention is not limited to frequencies and energy requirements currently regulated by the FCC.

Thus, the breadth and scope of the present invention should not be limited by any of the above-described exemplary embodiments, but should be defined only in accordance with the following claims and their equivalents.

What is claimed is:

1. A method, comprising:
   (a) generating at a reader module, a wireless interrogation signal for communicating with a radio frequency identification tag;
   (b) generating a radio signal for powering the radio frequency tag for communication, wherein the radio signal is generated by a radio module different from the reader module; and
   (c) receiving a reply signal from the radio frequency tag in response to the interrogation signal.

2. The method of claim 1, wherein the wireless interrogation signal is a UWB impulse radio signal.

3. The method of claim 1, wherein the reply signal is a UWB impulse radio signal.

4. An apparatus, comprising:
   a first portion configured to generate a wireless interrogation signal for communicating with a radio frequency tag, the radio frequency tag receiving operational power from a radio signal that is different from the interrogation signal; and
   a second portion configured to receive a reply signal from the radio frequency tag in response to the interrogation signal.

5. The apparatus of claim 4, wherein the wireless interrogation signal is a UWB impulse radio signal.

6. The apparatus of claim 4, wherein the reply signal is a UWB impulse radio signal.

7. A computer program product comprising a computer useable medium having computer program logic recorded thereon for enabling a processor in a computer system, the computer program logic comprising:
   program code for enabling the processor to cause generation of a wireless interrogation signal for communicating with a radio frequency tag, the radio frequency tag receiving operational power from a radio signal that is different from the interrogation signal; and
   program code for enabling the processor to cause reception of a reply signal from the radio frequency tag in response to the interrogation signal.

8. The computer program product of claim 7, wherein the wireless interrogation signal is a UWB impulse radio signal.

9. The computer program product of claim 7, wherein the reply signal is a UWB impulse radio signal.

10. A system in an apparatus, comprising:
    a radio frequency interrogation module configured to generate a wireless interrogation signal for communicating with a radio frequency tag; and
    a radio module different from the radio frequency interrogation module, the radio module configured to generate a radio signal for powering the radio frequency tag for communication.

11. The system of claim 10, wherein the wireless interrogation signal is a UWB impulse radio signal.

12. The system of claim 10, wherein the reply signal is a UWB impulse radio signal.

13. A method, comprising:
    (a) storing information in a radio frequency tag device;
    (b) receiving a wireless interrogation signal at the radio frequency tag device;
    (c) obtaining operational power for powering the radio frequency tag device from a received radio signal other than the interrogation signal; and
    (d) transmitting at least a portion of the stored information in a response to the received interrogation and radio signals.

14. The method of claim 13, wherein the wireless interrogation signal is a UWB impulse radio signal.

15. The method of claim 13, wherein the reply signal is a UWB impulse radio signal.

16. A radio frequency identification tag device, comprising:
    a memory configured to store information;
    a communications module configured to receive a wireless interrogation signal; and
    a power module configured to obtain operational power for powering the radio frequency tag device from a received radio signal other than the interrogation signal;
    wherein the communications module is further configured to transmit at least a portion of the stored information in a response signal in response to the received interrogation and radio signals.

17. The device of claim 16, wherein the wireless interrogation signal is a UWB impulse radio signal.

18. The device of claim 16, wherein the reply signal is a UWB impulse radio signal.

19. A computer program product comprising a computer useable medium having computer program logic recorded thereon for enabling a processor to process interrogation signals, the computer program logic comprising:
    program code for enabling the processor to store information in a radio frequency tag device;
    program code for enabling the processor to receive a wireless interrogation signal at the radio frequency tag device;
    program code for enabling the processor to cause obtaining operational power for powering the radio frequency tag device from a received radio signal other than the interrogation signal; and
    program code for enabling the processor to cause transmission of at least a portion of the stored information in response to the received interrogation and radio signals.

20. The computer program product of claim 19, wherein the wireless interrogation signal is a UWB impulse radio signal.

21. The computer program product of claim 19, wherein the reply signal is a UWB impulse radio signal.

* * * * *